United States Patent [19]

Severin et al.

[11] Patent Number: 4,733,930
[45] Date of Patent: Mar. 29, 1988

[54] METHOD OF MANUFACTURING A PLURALITY OF OPTICAL COMPONENTS

[75] Inventors: Petrus J. W. Severin; Adrianus P. Severijns; Johannes A. M. Steenbakkers, all of Eindhoven, Netherlands

[73] Assignee: U.S. Philips Corporation, New York, N.Y.

[21] Appl. No.: 921,983

[22] Filed: Oct. 22, 1986

[30] Foreign Application Priority Data

Oct. 28, 1985 [NL] Netherlands ............... 8502908

[51] Int. Cl.⁴ .................. G02B 6/29; H01S 3/30; B31F 5/00
[52] U.S. Cl. .................. 350/96.15; 350/96.1; 156/158; 156/159; 156/304.2
[58] Field of Search ............... 350/96.15, 96.1, 96.29; 156/158, 159, 288, 296, 304.2, 544

[56] References Cited

U.S. PATENT DOCUMENTS

| | | | |
|---|---|---|---|
| 4,387,954 | 6/1983 | Beasley | 350/96.15 |
| 4,461,536 | 7/1984 | Shaw et al. | 350/96.15 |
| 4,511,207 | 4/1985 | Newton et al. | 350/96.15 |
| 4,622,663 | 11/1986 | Ishikawa et al. | 350/96.15 |
| 4,676,583 | 6/1987 | Hicks, Jr. | 350/96.15 |

FOREIGN PATENT DOCUMENTS 2942664  5/1981  Fed. Rep. of Germany .

Primary Examiner—Stanley D. Miller
Assistant Examiner—B. P. Davis
Attorney, Agent, or Firm—Ernestine C. Bartlett

[57] ABSTRACT

To a carrier (1, 1') there is cemented a bar of a material (3, 3'), for example glass or a ceramic material, which is subsequently divided, using cuts (7, 7') which extend transversely of its longitudinal direction, into a number of slices (9, 9') which are separately cemented to the carrier. Each slice (9, 9') is provided with a groove (13, 13') which extends parallel to the cuts (7, 7'). The grooves (13, 13') are curved and have a center of curvature which is situated at the side of the bar (3, 3') which faces the carrier (1, 1'). In the grooves (13, 13') there are secured optical fibres (19, 19') which follow the curvature of the groove, after which a side portion of the fibres which is situated furthest from the carrier (1, 1') is ground off. A flat ground face (21, 21') is thus formed one each fibre (19, 19'). Such ground fibres (19, 19') are arranged so that their ground faces contact one another in order to form directional couplers, after which the slices (9, 9') are detached from the carrier (1, 1').

6 Claims, 18 Drawing Figures

METHOD OF MANUFACTURING A PLURALITY OF OPTICAL COMPONENTS

FIELD OF THE INVENTION

The invention relates to a method of manufacturing a plurality of optical components, wherein a first face of a block of material is cemented to a carrier and curved grooves are provided in a second face of the block which is situated opposite the first face, the centres of curvature of said grooves being situated at the side of the second face which faces the first face, after which optical fibres are secured in a number of the grooves so that they follow the curvature of the groove, a side portion of said fibres which is situated furthest from the first face being subsequently ground off, a flat ground face thus being formed on each fibre, after which directional couplers are formed by arranging the ground faces of the fibres thus ground against one another, the parts to be arranged on one another being aligned with respect to one another by means of wire-shaped elements which are arranged in the grooves which are not occupied by ground optical fibres.

BACKGROUND OF THE INVENTION

A method of this kind is known, for example from U.S. Pat. No. 4,511,207. However, this document does not disclose how the assembly formed can be separated into individual directional couplers. It has been found in practice that it is very difficult to separate the couplers, having small dimensions and being situated very near to one another, without inflicting damage. True mass production of optical components where large numbers of components are simultaneously manufactured at comparatively low costs, therefore, is not very well feasible. An object of the invention is to improve the method so that a comparatively large number (for example, tens) of components can be simultaneously formed and simply separated.

SUMMARY OF THE INVENTION

To this end, the method in accordance with the invention is characterized in that the block of material is shaped as a bar which, after having been cemented to the carrier, is divided, using cuts which extend transversely of its longitudinal direction, into a number of slices which are separately cemented to the carrier, after which each slice is provided with at least one groove which extends parallel to the cuts, the slices being detached from the carrier at a later stage.

Because the block of material is shaped as a bar having a substantial length in comparison with its other dimensions, the spacing of the components formed may be comparatively large, for example 5 mm; however, a large number of components can then still be simultaneously formed, for example twenty in the case of a bar having a length of 100 mm. Because the cuts are provided before the formation of the actual components, these components cannot be damaged during cutting. The slices are detached simply by separating the slices from the carrier, for example by dissolving the cement used in a suitable solvent or by softening it by heating. Generally, damaging of the components is then precluded.

The cost price of the components formed will be lower as more production operations are performed simultaneously on all components, that is to say before separation of the slices from the carrier. A version of the method, wherein the slices are separated from the carrier only at a very late stage, is characterized in that prior to the formation of the grooves, a first and a second bar are arranged so as to extend in parallel, after which corresponding grooves are formed in the two adjacently arranged bars in one operation, after the formation of the ground faces on the fibres, the second bar being disposed on the first bar so that the ground faces are arranged against one another in a two-by-two fashion, after which the ground faces are interconnected by means of a suitable adhesive. The simultaneous formation of the grooves in the two bars on the one hand offers the advantage that fewer separate manufacturing steps are required, and on the other hand ensures that the corresponding grooves will be situated in the same position in the two bars, thus increasing the precision with which the ground faces of fibres are arranged against one another. The directional couplers thus formed can be separated from the carrier in the described manner. However, it is alternatively possible to form two-way splitters from the assembly formed. A version of the method in accordance with the invention which is suitable for this purpose is characterized in that the grinding of the fibres is continued until the thickness of the fibres has been reduced to approximately one half at their thinnest point, the assembly formed by the first and the second bar arranged one against the other being cut into two substantially equal portions along a plane which extends perpendicularly to the longitudinal direction of the fibres at the area of the ground faces, the ends of the pairs of fibres thus formed at the area of said plane being polished, a polished end of a single optical fibre being secured against each of said ends in order to form a two-way splitter.

Each of the single optical fibres can be separately secured against one end of a pair of fibres. However, it is alternatively possible to perform this operation for all single fibres simultaneously. To this end, a further version of the method in accordance with the invention is characterized in that the single optical fibres are prepared by adjacently arranging a third and a fourth bar in parallel, by forming corresponding grooves in the two adjacently arranged bars in one operation, by securing optical fibres in the grooves of the third bar so that a side portion thereof projects from the groove, by arranging the fourth bar on the third bar so that the side portions projecting from the grooves of the third bar enter the corresponding grooves in the fourth bar, by cutting the assembly thus formed into two substantially equal portions along a plane which extends perpendicularly to the longitudinal direction of the fibres and halfway the grooves, and by polishing the fibre ends which are situated in said plane. In order to reduce the number of manufacturing steps required and at the same time enhance the accuracy, the corresponding grooves in all four bars are preferably formed in one operation.

BRIEF DESCRIPTION OF THE DRAWING

The invention will be described in detail hereinafter with reference to the drawing. Therein.

DETAILED DESCRIPTION OF THE PREFERRED EMBODIMENTS

Figure 1:
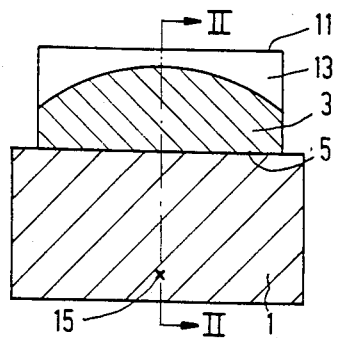
FIGS. 1 and 2 are a cross-sectional view and a longitudinal sectional view, respectively, of a bar cemented to a carrier during the execution of a first phase of one version of the method in accordance with the invention.
Figure 2:
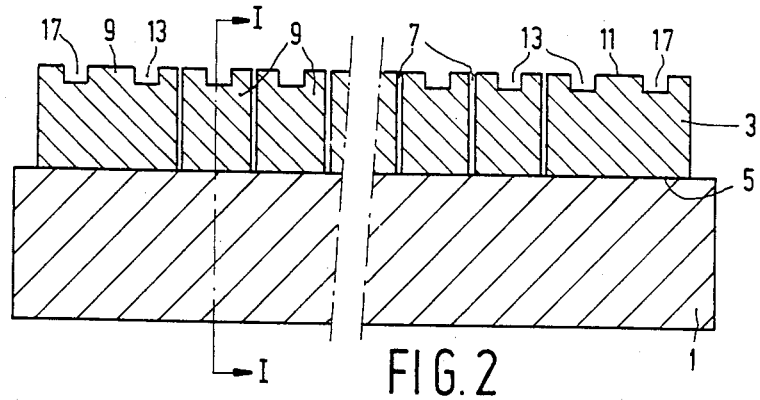

FIGS. 1 and 2 show a carrier 1, for example a plate of quartz glass of ceramic material, on which there is secured, using a suitable cement, for example shellac, a bar-shaped block of material 3, for example the same material as that of the carrier. The bar 3 has a rectangular cross-section and is cemented to the carrier 1 by way of a first face 5 (the lower face in the Figures). After cementing, the bar 3 is divided, by way of cuts 7 which extend transversely of its longitudinal direction, into a number of slices 9 which are individually cemented to the carrier 1 and each of which has a thickness of, for example 5 mm. The length of the bar 3 amounts to, for example 100 mm or more, so that twenty or more slices 9 can be formed. In the example shown, the thickness of the first and the last slice 9 amounts to approximately twice that of the other slices. The reasons why will be explained hereinafter.

In a second face 11 of the bar 3 (the upper face) which is situated opposite the first face 5, each slice 9 is provided with a curved groove 13 which extends parallel to the cuts 7, its centre of curvature 15 being situated at the side of the second face which faces the first face. The radius of curvature of the groove may be, for example, approximately 400 mm, its width being 250 μm and its depth at the shallowest point 125 μm. The grooves 13 are formed, for example by means of a precision sawing machine whose blade describes a curve which can be accurately predetermined, for example, an arc of circle. It is alternatively possible to make the bar 3 of silicon and to form the curved grooves by etching as described in the cited document U.S. Pat. No. 4,511,207. This possibility is attractive notably when grooves having an extremely small width, for example aproximately 125 μm, are desired. This is the case when very thin optical fibres without protective plastics layer are to be used during the steps to be described hereinafter. In the slices 9 of greater thickness (the first and the last slice of the example shown) there is provided an additional groove 17 which may extend in the same way as the groove 13 or which may consist of, for example, a straight groove which extends parallel to the upper face 11 and which has a constant depth of 125 μm.

Figure 3:
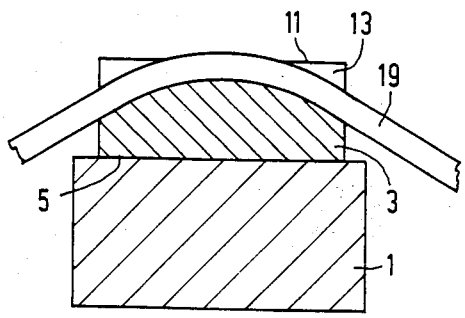
FIGS. 3 and 4 are a cross-sectional view and a longitudinal sectional view, respectively, during a next phase.
Figure 4:
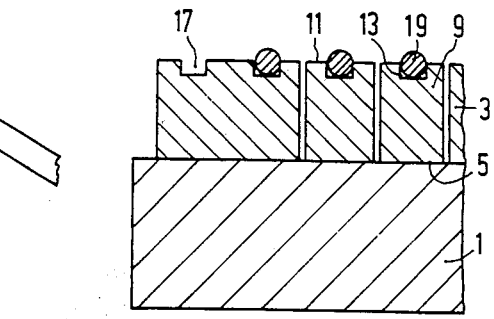
Figure 5:
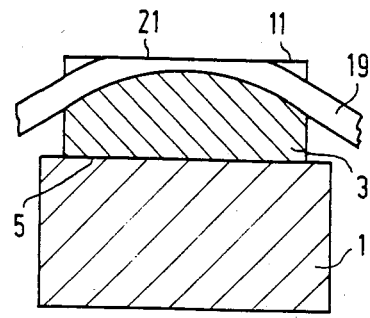
FIGS. 5 and 6 are a cross-sectional view and a longitudinal sectional view, respectively, during a further phase.
Figure 6:
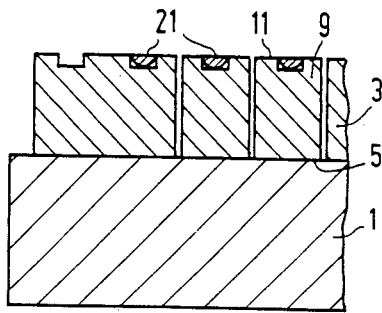

Subsequently, as appears from FIGS. 3 and 4, optical fibres 19 are secured in the grooves 13, for example by means of a suitable glue. The fibres 19 have, for example a core of glass having a high refractive index, a coating of glass having a lower refractive index, and a protective plastics layer. In the present example their outer diameter amounts to, for example 250 μm so that they fit exactly in the grooves 13. The fibres 19 are secured in the grooves 13 so that each fibre is situated on the bottom of the groove and follows the curvature of the groove. It is alternatively possible to remove the protective plastics layer over a given length and to fit the non-protected fibre in the groove. The width of the groove should then be approximately equal to the diameter of the non-protected fibre and the depth of the groove should amount to approximately one half the diameter. At the area of the shallowest part of the groove 13 the side portion of the fibre 19 which is situated furthest from the first face 5 of the bar 3 projects from the second face 11. During a next phase (see FIGS. 5 and 6) this side portion will be ground off, thus forming a flat ground face 21 which coincides with the second face 11.

Figure 7:
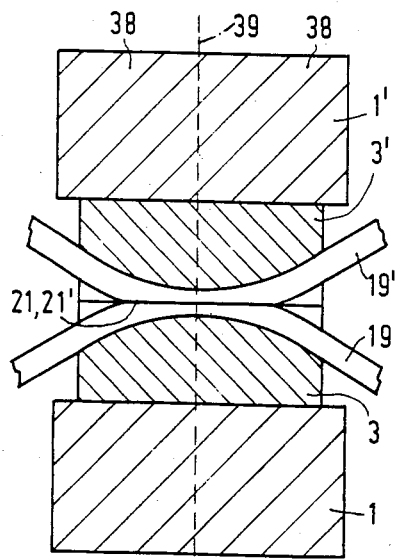
FIGS. 7 and 8 are a cross-sectional view and a longitudinal sectional view, respectively, during a still further phase.
Figure 8:
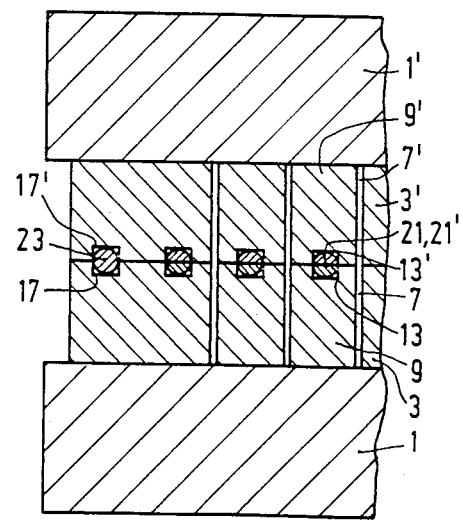

FIGS. 7 and 8 show that the ground faces 21 of such ground fibres 9 are subsequently arranged against one another in a two-by-two fashion in order to form directional couplers. To this end, a second bar 3' which is cemented to a second carrier 1' and which has been prepared in the same way as the first bar 3 is arranged upside down on the first bar. In order to position the two bars 3, 3' with respect to another so that the two ground faces 21, 21' register exactly, for example light could be introduced via one end of one of the fibres (for example the left end of the fibre 19) and the light intensity could be measured at the other ends of the two fibres 19 and 19' (i.e. the right ends). When the light intensity is maximum and approximately the same for the two fibres 19, 19', an optimum position of the ground faces 21, 21' with respect to one another has been obtained. The method in accordance with the invention, however, utilizes a different procedure which is better suitable for mass manufacture and which does not require a light intensity measurement during the stacking of the bars 3, 3'. To this end, after the grinding operation in each of the additional grooves 17 there is arranged a wire-shaped element 23 which projects from the groove. The bar 3' is provided with corresponding additional grooves 17' which are situated exactly opposite the grooves 17 when the two bars 3, 3' are stacked in the correct position. Therefore, it suffices to shift the bar 3' until the wire-shaped element 23 engages the groove 17'. The alignment of the two bars 3, 3' is, therefore, a purely mechanical operation so that a time-consuming and expensive optical measurement can be dispensed with. The wire-shaped element 23 is preferably formed by an optical fibre of the same kind as the fibres 19, 19'. The formation of additional grooves 17 in slices 9 of greater width is not strictly necessary for performing the described method of alignment. Another possibility consists in imparting the same width to all slices 9 and providing them with one groove 13, no fibre 19 being secured in one or more of these grooves prior to grinding. The wire-shaped elements 23 can then be accommodated in those grooves 13 which are not used for a fibre 19. After alignment, the contacting faces are permanently interconnected by means of a suitable adhesive, for example a thermally or UV-curable glue which has a low viscosity so that the layer of glue will be very thin and the exact values of the refractive index and of the (comparatively high) coefficient of expansion of the glue will not be of importance.

Using the described method, a large number (for example twenty) of directional couplers is simultaneously formed; these couplers can subsequently be simply separated from one another by removal of the carriers 1, 1'. This can be realized, for example by dissolving the cement in a suitable solvent or by softening the cement by heating. The simultaneous manufacture of large numbers of these components, of course, has a favourable effect on their cost price. In order to ensure that all components manufactured comply with the requirements imposed, however, each pair of oppositely situated ground faces 21, 21' must occupy the correct position with respect to one another. This will be the case when all corresponding grooves 13, 13' in the two bars 3, 3' are situated at the same distance from the additional grooves 17, 17', respectively, which means that the two bars 3, 3' are identical. This can be achieved by arranging the first bar 3 and the second bar 3' in parallel prior to the formation of the grooves and by subsequently forming the corresponding grooves in the two adjacently arranged bars in one operation. To this end, the two bars 3, 3' can be cemented to a common carrier 1 or to two separate carriers 1, 1' which are temporarily interconnected.

Figure 9:
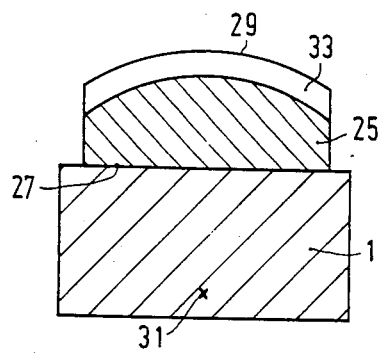
FIGS. 9 to 12 are cross-sectional views taken during successive phases of a second version of the method in accordance with the invention.
Figure 10:
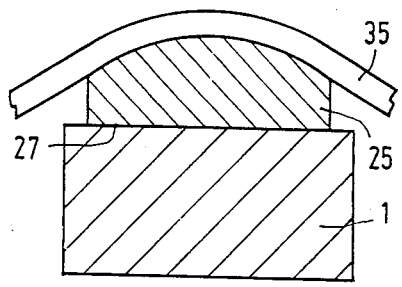

The above example was based on a bar 3 having a rectangular cross-section in which there are provided grooves 13 whose depth varies from 125 μm at the shallowest point to more than 250 μm near the edges of the bar when use is made of a fibre provided with a protective plastics layer. For a fibre without protective layer, these depths amount to 62.5 μm and 125 μm, respectively. In an alternative version of the method, which will now be described with reference to the FIGS. 9 and 12, use is made of a bar 25 having a flat first face 27 which is cemented to the carrier 1, whilst its second, oppositely situated face 29 is curved. The second face is, for example a cylindrical surface whose axis 31 extends parallel to the longitudinal direction of the bar 25 and is situated at the side of the second face which faces the first face 27. In the second face 29 there are formed grooves 33 which follow the curvature of the second face and which have a constant depth of, for example 250 μm which equals their width. In these grooves there are secured optical fibres 35 (see FIG. 10) which may have the same construction and dimensions as the previously described fibres 19. Because the depth of the grooves 33 is constant and equal to the diameter of the fibres 35, the fibres will not project from the grooves in any location.

Figure 11:
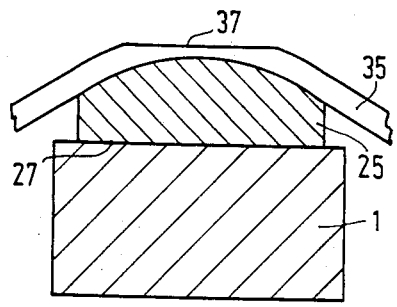
Figure 12:
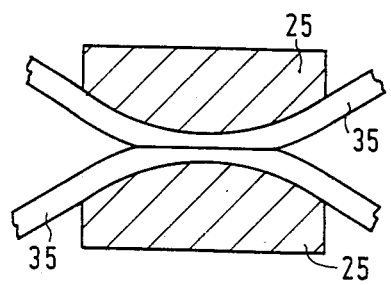

Subsequently (see FIG. 11), the side portions of the fibres 35 which are situated furthest from the first face 27 are ground off, together with the intermediate portions of the bar 25, thus forming a flat ground face 37. Grinding is continued until the thickness of the fibres 35 at the thinnest point reaches a predetermined value. Subsequently, the ground faces 37 of the ground fibres 35 are arranged against one another in a two-by-two fashion, for example in the same way as described with reference to the FIGS. 7 and 8. To this end, additional grooves can be again provided for accommodating wire-shaped elements (not shown) or some of the grooves 33 can be filled with fibres only after termination of the grinding operation. After the removal of the carriers 1, directional couplers will be obtained again as shown in FIG. 12.

When use is made of the second method (described with reference to the FIGS. 9 to 12), more material must be removed by grinding, so that the grinding process will be longer than in the first method (described with reference to the FIGS. 1 to 8). The first method has a further advantage in that, when the desired depth is reached the face 11 is contacted so that the rate at which material is removed will be substantially reduced. The grinding process is thus more or less automatically terminated. Moreover, the cementing surface is comparatively large because it has the dimensions of the entire face 11.

Because it is known that grinding in a state of mechanical stress (occurring when the fibres are bent) leads to an increased risk of fibre fractures, grinding should be performed under a carefully controlled pressure and preferably in the longitudinal direction of the fibres. The mechanical stress is preferably minimized by choosing the radius of curvature of the grooves to be as large as possible. If necessary, the fibre can be stress-relieved by means of a thermal treatment.

The method in acccordance with the invention can also be used for the manufacture of two-way splitters. In that case the grinding of the fibres 35 is continued until the thickness of the fibres has been reduced to approximately one half at the thinnest point. Furthermore, the assembly formed by the first and second bars 3, 3' arranged one against the other and shown in the FIGS. 7 and 8 is cut into two substantially equal portions 38 along a plane 39. This plane is denoted by a broken line in FIG. 7. It extends perpendicularly to the longitudinal direction of the fibres 19, 19' at the area of the ground faces 21, 21', and hence parallel to the longitudinal direction of the bars 3, 3'. After cutting, the ends of the pairs of fibres 19 and 19' which have been locally ground down to approximately half their thickness will be situated in the plane 39 in each portion 38. Thus, the two half fibres 19 and 19' will together have a thickness equal to the thickness of a whole fibre. The free ends of these fibre pairs can then be polished and to each of these ends there can be connected a like-wise polished end of a single fibre having the original thickness, for example by means of a suitable adhesive. Each divided directional coupler can thus form two two-way splitters.

Figure 13:
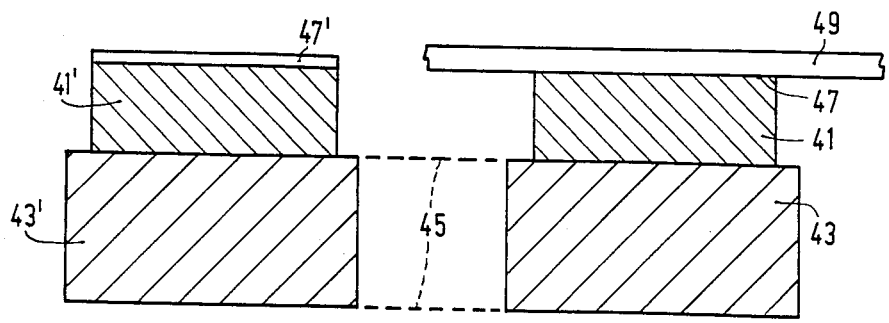
FIGS. 13 to 15 are cross-sectional views taken during successive phases of a third version of the method in accordance with the invention.
Figures 14, 15:
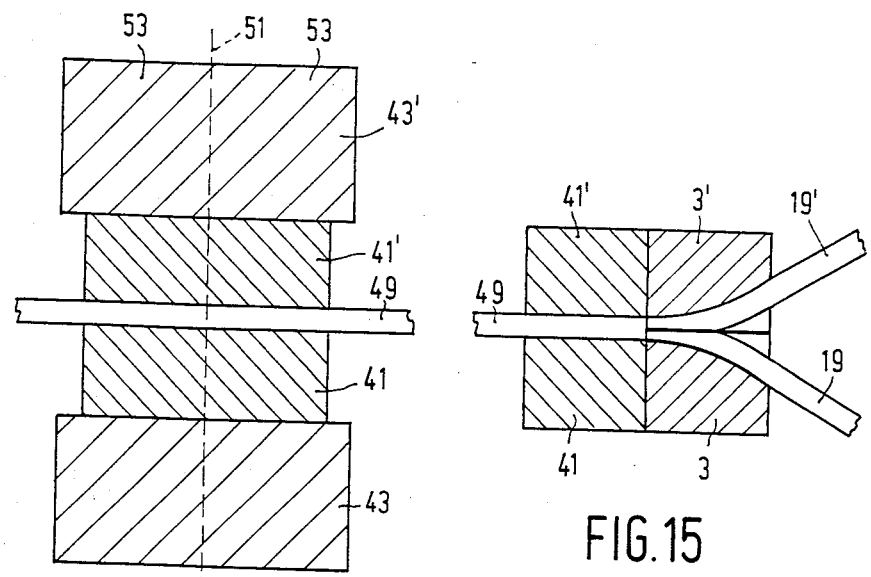

However, it is alternatively possible to manufacture a large number of two-way splitters simultaneously as will be described hereinafter with reference to the FIGS. 12 to 15. To this end, the single optical fibres are first prepared by means of a method which is analogous to the previously described method for the manufacture of the directional couplers. A third bar 41 and a fourth bar 41' of, for example the same material as that of the bars 3, are cemented to carriers 43 and 43' which are subsequently connected to one another as denoted by broken lines 45 in FIG. 13. It will be apparent that it is also possible to cement the bars 41 and 41' to a common carrier which is divided into two carriers 43 and 43' at a later stage. Using cuts which extend transversely of their longitudinal direction, the two bars are again divided into slices which are individually cemented to the carrier by means of the method described with reference to FIG. 2. The adjacently arranged bars 41 and 41' are then provided with grooves, corresponding grooves 47 and 47' being formed in one operation. FIG. 13 shows that subsequently an optical fibre 49 is secured in the groove 47 in the third bar 41, for example by means of an adhesive. Preferably, the optical fibre 49 is of the same type as the optical fibres 19 and 19' and also has the same dimensions. The paths of the grooves 47 and 47' may be straight and the grooves may have a width of 250 μm as well as a uniform depth of 125 μm. Thus, approximately one half of the fibre 49 will project from the groove 47. After separation of the carriers 43 and 43', the fourth bar 41' is arranged upside down on the third bar 41, so that the side portions of the fibres 49 projecting from the grooves 47 in the third bar will be situated in the corresponding grooves 47' of the fourth bar. The assembly thus formed is shown in FIG. 14. It is subsequently cut along a plane 51. This plane is denoted by a broken line in FIG. 14; it is situated approximately halfway the grooves 47 and 47' and extends perpendicularly to the longitudinal direction of these grooves, i.e. parallel to the longitudinal direction of the bars 41, 41'.

The assembly is thus divided into two substantially equal portions 53. The ends of the cut fibres 49 are situated in the plane 51 in each of these portions. The ends are subsequently polished, after which a portion 53 is secured, by way of the face 51, against the face 39 of a portion 38 (see FIG. 7) so that the ends of the fibres 49 are situated exactly opposite the corresponding ends of the fibre pairs 19, 19'. These two parts are subsequently interconnected by means of a suitable adhesive, after which the carriers 1, 1' and 43, 43' are removed in the previously described manner. Thus, separate two-way splitters are formed, one of which is shown in FIG. 15. In order to ensure that all corresponding fibre ends in the planes 39 and 51 will be situated exactly opposite one another, the corresponding grooves in all four bars 3, 3', 41, 41' are preferably formed in one operation. To this end, all carriers 1, 1', 43, 43' can be interconnected prior to this operation, or for all bars use can be made of a single carrier which is subsequently divided.

Figure 16:
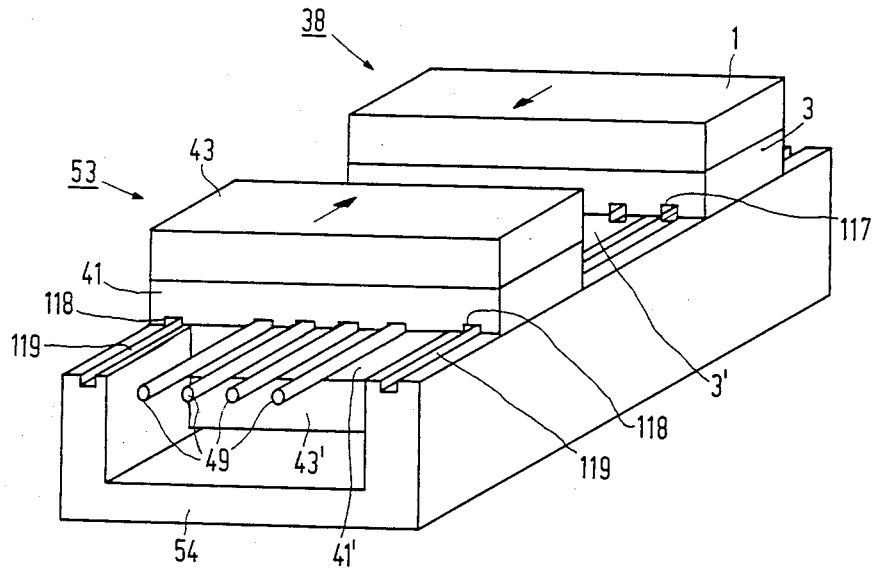
FIG. 16 is a perspective view of a jig for use with the third version.

For the accurate and fast positioning of the portions 38 and 53 with respect to one another, use can be made of, for example a U-shaped jig 54 as shown in FIG. 16. The distance between the outer sides of the legs of the jig 54 amounts to approximately the length of the bars 3 and 41. The bars 3' and 41' are then shorter, so that they will be arranged between the legs when the end portions of the bars 3 and 41 are arranged on the free ends of the legs. In the end portions of the bars 3 and 41 there are formed additional grooves 117 and 118 which are capable of cooperating with grooves 119 in the ends of the legs of the jig 54 in order to accommodate a wire-shaped element (not shown), analogously to the element in the grooves 17, 17' in FIG. 8. As a result, the grooves 117 and 118 will be exactly aligned. The location of these grooves in the bars 3 and 41 is chosen so that the ends of the fibres 49 will then also be situated exactly opposite the corresponding ends of the fibre pairs 19, 19'. The portions 38 and 53 are shifted against one another in this position and are cemented together, after which they can be removed from the jig 54.

Instead of the assembly shown in the FIGS. 7 and 8, use can also be made, of course, of an assembly manufactured in accordance with the method described with reference to FIGS. 9 to 12 for the manufacture of two-way splitters. The two-way splitters formed satisfy very severe requirements. Measurements have revealed that the described method enables the manufacture of two-way splitters which exhibit a loss of light of less than 20%. This means that more than 80% of the light coupled-in via the fibre 49 is coupled-out again via the fibres 19 and 19'; each of the latter fibres emits approximately the same amount of light, for example, 40% or more.

Figures 17, 18:
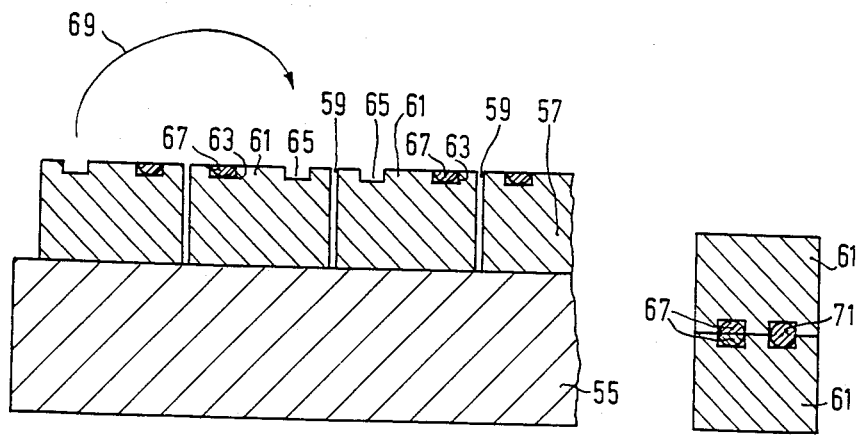
FIG. 17 is a longitudinal sectional view taken during a phase of a fourth version of the method in accordance with the invention.
FIG. 18 is a cross-sectional view of a finished product obtained by means of the method shown in FIG. 17.

The methods described thus far with reference to the FIGS. 1 to 12 enable the simultaneous manufacture of large numbers of directional couplers, the operations being performed on all components simultaneously up to the last stage of manufacture. However, for the manufacture of components with an extremely high precision it may be desirable to perform the last part of the operation on the components separately. This part concerns the positioning of the ground faces 21 or 37 against one another. As is shown in FIG. 17, a bar 57 cemented to a carrier 55 is then divided into slices 61 by way of cuts 59 which extend transversely of its longitudinal direction, said slices having a thickness so that in each slice two grooves 63 and 65 can be formed in parallel. The distance between the adjoining grooves 63 and 65 is the same for all slices. The grooves denoted by the reference numeral 63 are curved and are shaped, for example in the same way as the grooves 13 described with reference to the FIGS. 1 and 2. The grooves 65 may be identical to the grooves 17 described with reference to FIG. 4. In each groove 63 there is secured an optical fibre 67 which has the same diameter as the optical fibres 19. The fibres 67 are ground in the same way as described with reference to the FIGS. 5 and 6. Subsequently, the slices 61 are removed from the carrier 55 by means of the previously described method and adjacently situated slices are arranged, (as denoted by the arrow 69) on one another so that the grooves 63 face one another. The grooves 63 filled with a ground fibre 67 are thus each time arranged on one another (see FIG. 18). In the other grooves 65, also being situated on one another, there are inserted wire-shaped elements 71 which may consist of optical fibres having the same dimensions as the fibres 67. As has already been described, these wire-shaped elements ensure very exact mutual positioning of the ground faces of the fibres 67. Because in the present example each pair of ground faces to be arranged on one another is separately aligned by means of its own wire-shaped element 71, a very high precision can be achieved. However, this implies a higher cost price because fewer operations are simultaneously performed on all components.

It will be apparent that the diameter of the core of the fibre is not important for the described method. The method can be used for multimode fibres having a comparatively thick core as well as for monomode fibres having a comparatively thin core. The cutting of the grooves requires the use of machines which allow for the required precision (in the order of magnitude of 1 μm) to be achieved.

What is claimed is:

1. A method of manufacturing a plurality of optical components, wherein a face (5) of a block of material (3) is cemented to a carrier (1) and curved grooves (13) are provided in a second face (11) of the block which is situated opposite the first face, the centres of curvature (15) of said grooves being situated at the side of the second-face which faces the first face, after which optical fibres (19) are secured in a number of the grooves so that they follow the curvature of the groove, a side portion of said fibres which is situated furthest from the first face being subsequently ground off, a flat ground face (21) thus being formed on each fibre, after which directional couplers are formed by arranging the ground faces of the fibres thus ground against one another, the parts to be arranged on one another being aligned with respect to one another by means of wire-shaped elements (23) which are arranged in the grooves

(17) which are not occupied by ground optical fibres, characterized in that the block of material (3) is shaped as a bar which, after having been cemented to the carrier (1), is divided, using cuts (7) which extend transversely of its longitudinal direction, into a number of slices (9) which are separately cemented to the carrier, after which each slice is provided with at least one groove (13, 17) which extends parallel to the cuts, the slices being detached from the carrier at a later stage.

2. A method as claimed in claim 1, characterized in that prior to the formation of the grooves (13, 17), a first and a second bar (3, 3') are arranged so as to extend in parallel, after which corresponding grooves are formed in the two adjacently arranged bars in one operation, after the formation of the ground faces (21, 21') on the fibres (19, 19') the second bar (3') being disposed on the first bar (3) so that the ground faces are arranged against one another in a two-by-two fashion, after which the ground faces are interconnected by means of a suitable adhesive.

3. A method as claimed in claim 2, characterized in that the grinding of the fibres (19, 19') is continued until the thickness of the fibres has been reduced to approximately one half at their thinnest point, the assembly formed by the first and the second bar (3, 3') arranged one against the other being cut into two substantially equal portions (38) along a plane (39) which extends perpendicularly to the longitudinal direction of the fibres (19, 19') at the area of the ground faces (21, 21'), the ends of the pairs of fibres thus formed at the area of said plane being polished, a polished end of a single optical fibre (49) being secured against each of said ends in order to form a two-way splitter.

4. A method as claimed in claim 3, characterized in that the single optical fibres (49) are prepared by adjacently arranging a third and a fourth bar (41, 41') in parallel, by forming corresponding grooves (47, 47') in the two adjacently arranged bars in one operation, by securing optical fibres (49) in the grooves of the third bar (41) so that a side portion thereof projects from the groove, by arranging the fourth bar (41') on the third bar so that the side portions projecting from the grooves of the third bar enter the corresponding grooves (47') in the fourth bar, by cutting the assembly thus formed into two substantially equal portions (53) according to a plane (51) which extends perpendicularly to the longitudinal direction of the fibres and halfway the grooves, and by polishing the fibre ends which are situated in said plane.

5. A method as claimed in claim 4, characterized in that the corresponding grooves (13, 13', 47, 47') in all four bars (3, 3', 41, 41') are formed in one operation.

6. A method as claimed in claim 1, characterized in that in each slice (61) at least two adjacent grooves (63, 65) are formed in parallel, the distance between adjacently situated grooves being the same for all slices, in one of the grooves (65) in each slice there not being arranged a fibre to be ground, the slices being detached from the carrier (55) after the grinding of the fibres (67) in the other grooves (63), after which they are arranged two-by-two so that their ground faces contact one another, wire-shaped elements (71) being inserted into the grooves (65) which do not accommodate ground fibres.

* * * * *